US012608391B2

(12) United States Patent
Suk et al.

(10) Patent No.: US 12,608,391 B2
(45) Date of Patent: Apr. 21, 2026

(54) METHOD AND SYSTEM FOR ADVANCED RETRIEVAL-AUGMENTED GENERATION THROUGH METADATA EXTRACTION AND RETRIEVAL ENGINE MIXING

(71) Applicant: LINE Plus Corporation, Seongnam-si (KR)

(72) Inventors: Jin Hwan Suk, Seongnam-si (KR); Hyun Hak Kim, Seongnam-si (KR); Hee Cheol Park, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 19/066,756

(22) Filed: Feb. 28, 2025

(65) Prior Publication Data

US 2025/0348503 A1    Nov. 13, 2025

(30) Foreign Application Priority Data

May 9, 2024    (KR) ........................ 10-2024-0061239

(51) Int. Cl.
| | |
|---|---|
| *G06F 16/00* | (2019.01) |
| *G06F 16/22* | (2019.01) |
| *G06F 16/242* | (2019.01) |
| *G06F 16/248* | (2019.01) |
| *G06F 16/383* | (2019.01) |

(52) U.S. Cl.
CPC ........ *G06F 16/248* (2019.01); *G06F 16/2237* (2019.01); *G06F 16/2438* (2019.01); *G06F 16/383* (2019.01)

(58) Field of Classification Search
CPC .. G06F 16/248; G06F 16/2237; G06F 16/383; G06F 16/2438

USPC .......................................................... 707/722
See application file for complete search history.

(56) References Cited

U.S. PATENT DOCUMENTS

| | | | |
|---|---|---|---|
| 11,308,149 B2 * | 4/2022 | Majkowska .......... | G06F 16/532 707/707 |
| 11,436,288 B1 * | 9/2022 | Mass ....................... | G06F 18/22 707/707 |
| 11,853,370 B2 * | 12/2023 | Santiago ................ | G06N 5/022 707/707 |
| 2020/0019636 A1 * | 1/2020 | Srinivasaraghavan ..................... G06F 16/9535 707/707 |

(Continued)

FOREIGN PATENT DOCUMENTS

KR        10-2648139 B1    3/2024

*Primary Examiner* — Alexandria Y Bromell
(74) *Attorney, Agent, or Firm* — Harness, Dickey & Pierce, P.L.C.

(57) ABSTRACT

Disclosed is a method and system for advanced retrieval-augmented generation through metadata and search engine mixing. A retrieval-augmented generation method may include acquiring data of a user; constructing a vector database by embedding the data of the user; receiving and embedding a query of the user; retrieving data corresponding to the embedded query of the user from the vector database using a plurality of retrievers, each retriever of the plurality of retrievers differing from each other; and generating a response to the query of the user by inputting a prompt to an artificial intelligence model, the prompt including the query and the data retrieved using each retriever of the plurality of retrievers.

16 Claims, 5 Drawing Sheets

(56)                    References Cited

U.S. PATENT DOCUMENTS

| | | | |
|---|---|---|---|
| 2024/0168978 A1* | 5/2024 | Goel | G06F 16/2237 |
| | | | 707/707 |
| 2024/0281487 A1* | 8/2024 | Bathwal | G06F 16/24575 |
| | | | 707/707 |

* cited by examiner

FIG. 5

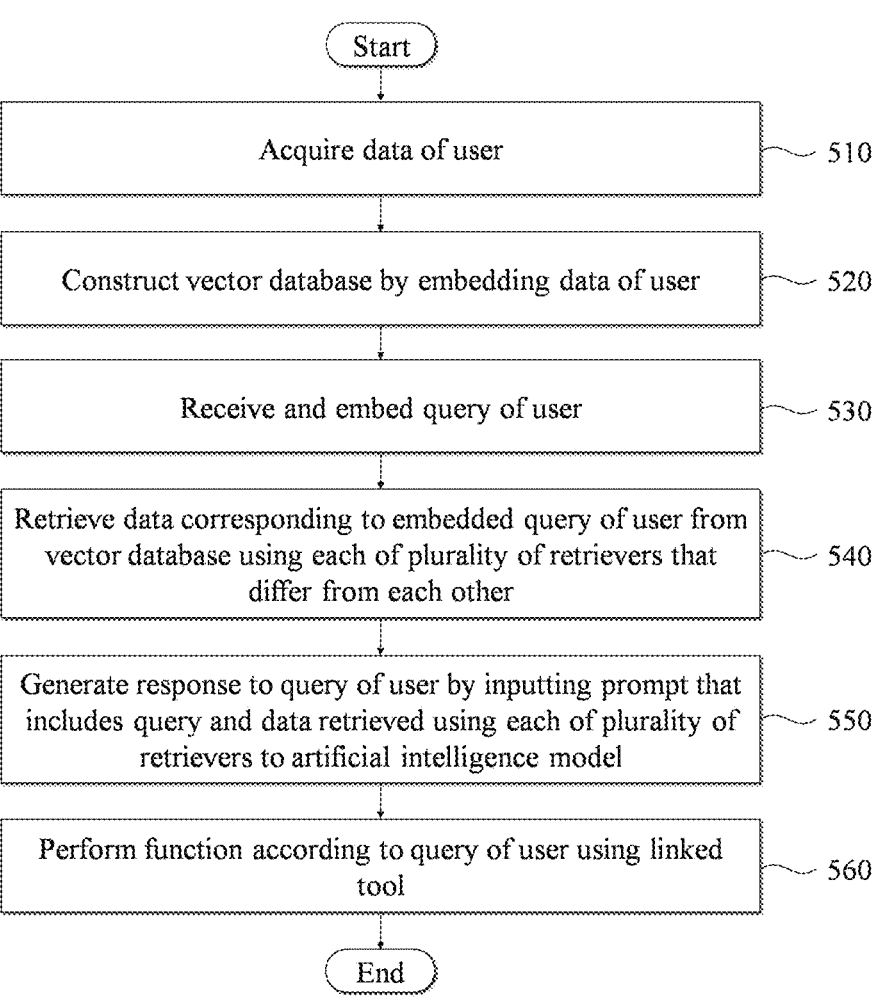

Start

Acquire data of user ~ 510

Construct vector database by embedding data of user ~ 520

Receive and embed query of user ~ 530

Retrieve data corresponding to embedded query of user from vector database using each of plurality of retrievers that differ from each other ~ 540

Generate response to query of user by inputting prompt that includes query and data retrieved using each of plurality of retrievers to artificial intelligence model ~ 550

Perform function according to query of user using linked tool ~ 560

End

METHOD AND SYSTEM FOR ADVANCED RETRIEVAL-AUGMENTED GENERATION THROUGH METADATA EXTRACTION AND RETRIEVAL ENGINE MIXING

CROSS-REFERENCE TO RELATED APPLICATION(S)

This U.S. non-provisional application and claims the benefit of priority under 35 U.S.C. § 119 to Korean Patent Application No. 10-2024-0061239, filed May 9, 2024, the entire contents of which are incorporated herein by reference in their entirety.

BACKGROUND

Technical Field

Some example embodiments relate to a method and system for advanced retrieval-augmented generation (RAG) through metadata extraction and search engine mixing.

Background

As a type of artificial intelligence trained on a large text data corpus to generate a human-like response to an input, a large language model (LLM) is a language model configured as an artificial neural network (ANN) with numerous parameters (usually, billions of weights or more). This LLM may be trained with a significant amount of unlabeled text using self-supervised learning or semi-self-supervised learning.

Retrieval-augmented generation (RAG) refers to technology used to supplement a hallucination phenomenon and untrained knowledge of the LLM, and is a process that may optimize the output of the LLM to refer to a trusted knowledge base outside a learning data source before generating a response. Since the RAG extends an already powerful function of the LLM based on internal knowledge of a specific domain or organization, there is no need to retrain a model. This may be a cost-effective approach to improve LLM results and to remain relevant, accurate, and useful in various situations.

SUMMARY

Some example embodiments provide a method and system for advanced retrieval-augmented generation (RAG) through metadata extraction and search engine mixing.

Some example embodiments of inventive concepts provide a retrieval-augmented generation method of a computer device including at least one processor, the method including acquiring, by the at least one processor, data of a user; constructing, by the at least one processor, a vector database by embedding the data of the user; receiving, by the at least one processor, and embedding a query of the user; retrieving, by the at least one processor, data corresponding to the embedded query of the user from the vector database using a plurality of retrievers, each retriever of the plurality of retrievers differing from each other; and generating, by the at least one processor, a response to the query of the user by inputting a prompt to an artificial intelligence model, the prompt including the query and the data retrieved using the plurality of retrievers.

Some example embodiments of inventive concepts provide a computer device including at least one processor configured to execute computer-readable instructions, wherein the at least one processor is configured to acquire data of a user, to construct a vector database by embedding the data of the user, to receive and embed a query of the user, to retrieve data corresponding to the embedded query of the user from the vector database using a plurality of retrievers, each retriever of the plurality of receivers differing from each other, and to generate a response to the query of the user by inputting a prompt to an artificial intelligence model, the prompt including the query and the data retrieved using each receiver of the plurality of retrievers.

According to some example embodiments, it is possible to provide a method and system for advanced retrieval-augmented generation (RAG) through metadata extraction and search engine mixing.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 5 is a flowchart illustrating an example of a retrieval-augmented generation method according to at least one example embodiment.

DETAILED DESCRIPTION

Figure 1:
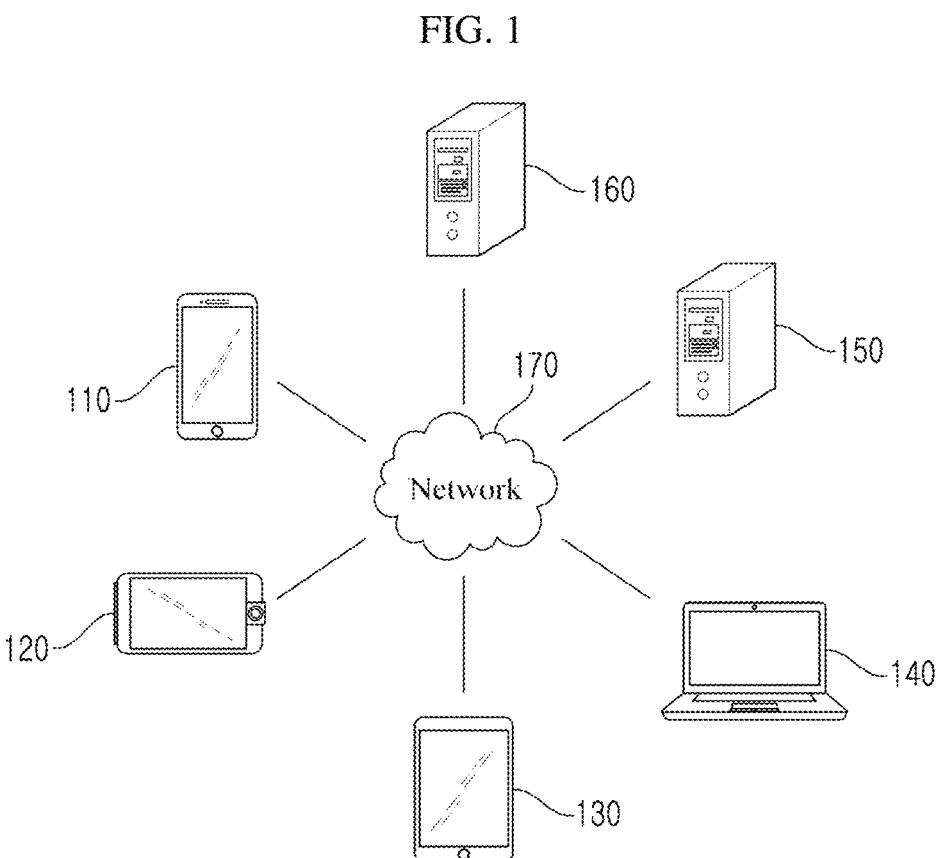
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the inventive concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

A retrieval-augmented generation (RAG) system according to some example embodiments may be implemented by at least one computer device. A computer program according to some example embodiments may be installed and run on the computer device, and the computer device may perform a retrieval-augmented generation method according to some example embodiments under control of the computer program. The aforementioned computer program may be stored in a computer-readable record medium to implement the retrieval-augmented generation method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited, and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only, and example embodiments are not limited thereto.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170.

Figure 2:
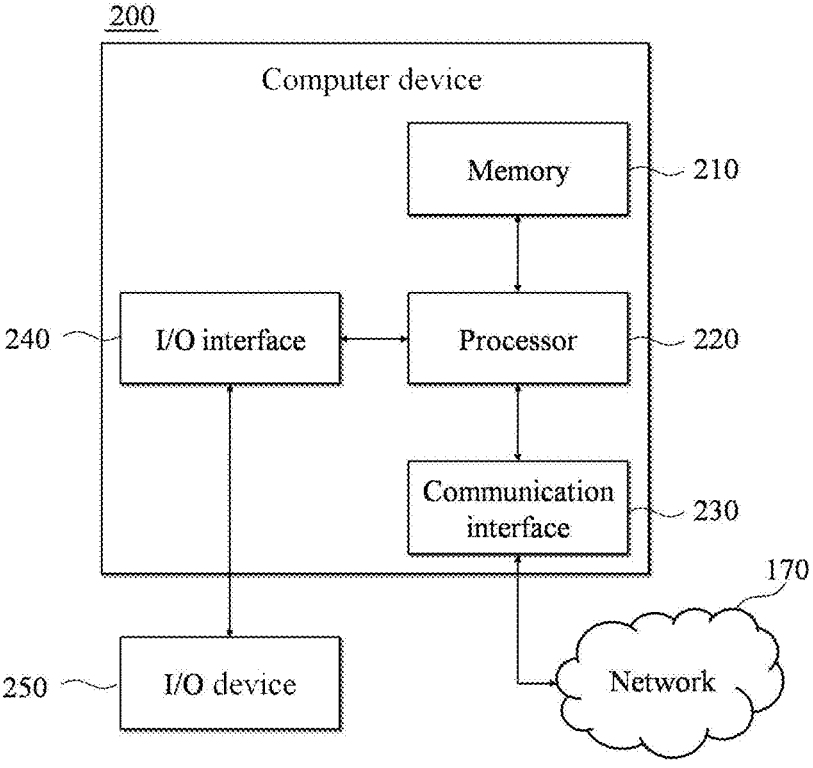
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer device 200 as a permanent storage device separate from the memory 210. Additionally or alternatively, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to some example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the computer device 200 and another apparatus, for example, the aforementioned storage devices, over the network 170. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. A signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. In some example embodiments, the I/O interface 240 may be a device for interfacing with an apparatus in which an input function and an output function are integrated into a single function, such as a touchscreen. The I/O device 250 may be configured as a single apparatus with the computer device 200. For example, the I/O device 250 may be implemented in a form in which a touchscreen, a microphone, a speaker, and the like are included in the computer device 200, such as a smartphone, but example embodiments are not limited thereto.

Additionally or alternatively, according to some example embodiments, the computer device 200 may include a greater or smaller number of components than the number of components shown in FIG. 2. However, there is no need to clearly illustrate most conventional components. For example, the computer device 200 may be configured to include at least a portion of the I/O device 250 or may further include other components, such as a transceiver and a database.

Figure 3:
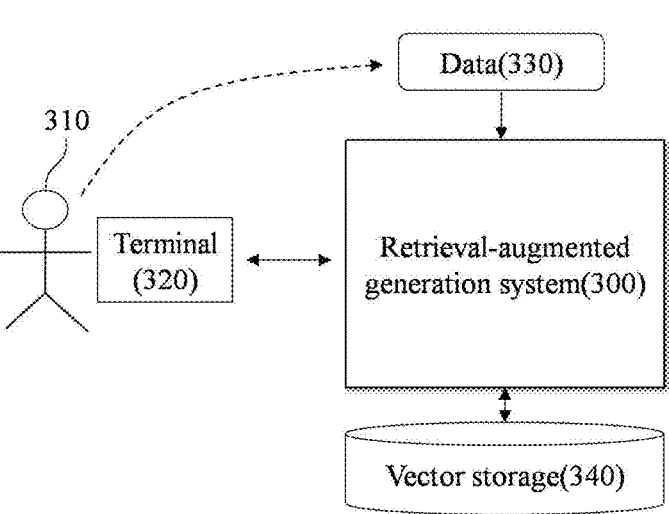
FIG. 3 illustrates a schematic example of a retrieval-augmented generation (RAG) system according to at least one example embodiment.

FIG. 3 illustrates a schematic example of a retrieval-augmented generation system according to at least one example embodiment. A retrieval-augmented generation system 300 according to some example embodiments may generate a response to a query transmitted from a user 310 through interaction with the user 310, and may provide the response to the user 310.

The user 310 may connect to the retrieval-augmented generation system 300 using a terminal 320 as a physical electronic device of the user 310. For example, a computer program such as an application linked with the retrieval-augmented generation system 300 may be installed and run on the terminal 320 of the user 310, and the terminal 320 of the user 310 may be provided with a service from the retrieval-augmented generation system 300 through connection to the retrieval-augmented generation system 300 under control of the running computer program. The query of the user 310 may be input to the terminal 320 and may be delivered to the retrieval-augmented generation system 300.

The retrieval-augmented generation system 300 may generate and provide a response to the query of the user 310 using data 330 related to the user 310. The data 330 may be data generated and provided by the user 310, data collected on a service for the user 310 while the user 310 uses a specific service, data generated and provided by an administrator of a service in relation to a service used by the user 310, and/or data generated and provided in relation to a service operated by the user 310. For example, the data 330 may include schedule data, a contact list, and shopping information of the user 310, but example embodiments are not limited thereto. The retrieval-augmented generation system 300 may generate and provide a response using the schedule data, the contact list, and/or the shopping information of the user 310 in response to the query of the user 310. In some example embodiments, the data 330 may include information (hereinafter, "chat data") on instant messages transmitted and received in association with an account of the user 310 on an instant messaging service used by the user 310. The data 330 may include information on an account that transmits the instant message, an account that receives the instant message, a point in time at which the instant message is transmitted, a point in time at which the instant message is received, and/or content of the instant message. The retrieval-augmented generation system 300 may generate and provide a response using the chat data of the user 310 in response to the query of the user 310. In some example embodiments, the data 330 may include customer consultation related information collected in relation to a customer service (CS) of the service used by the user 310. The retrieval-augmented generation system 300 may generate and provide a chatbot and/or an assistant for the corresponding service using the customer consultation related information, and the chatbot and/or the assistant of the corresponding service may provide a response using the customer consultation related information in response to the query of the user 310. In some example embodiments, the data 330 may include information on a product being sold on the service operated by the user 310. In response to the query of the user 310, the retrieval-augmented generation system 300 may generate and provide various responses related to the product, such as a marketing plan or a service operation plan using information on the product.

The retrieval-augmented generation system 300 may initially index the data 330. For example, the retrieval-augmented generation system 300 may receive a chat data file in an SQLite format or text from the instant messaging service. Then, the retrieval-augmented generation system 300 may analyze the received chat data file (e.g., parse data in the form of text, CSV, Markdown, and/or image), and may extract metadata (e.g., transmission time of the instant message, reception time of the instant message, speaker (account of the instant messaging service), keyword to content of the instant message, and/or summary to content of the instant message). Additionally or alternatively, the retrieval-augmented generation system 300 may split the chat data based on a chunk unit (e.g., character unit and/or semantic unit). Additionally or alternatively, the retrieval-augmented generation system 300 may generate a vector by embedding the chat data of the chunk unit, and may store the generated vector in a vector storage 340. The chat data of the chunk unit may also include information (keyword, summary, metadata, etc.) extracted from the data 330. Embedding may be performed using at least one of well-known solutions, such as OpenAI and multilingual-e5, but example embodiments are not limited thereto. Meanwhile, at least one of well-known solutions, such as OpenSearch and Milvus, may be used as the vector storage 340, but example embodiments are not limited thereto.

After the vector generated by embedding the data 330 is stored in the vector storage 340, the retrieval-augmented generation system 300 may receive the query from the user 310. The retrieval-augmented generation system 300 may retrieve information related to the query of the user 310 from the vector storage 340. The retrieval-augmented generation system 300 may simultaneously use a plurality of search engines (e.g., a plurality of retrievers) for search advancement. Table 1 below shows an example of three search engines.

TABLE 1

| Retriever | engine | Chunk size | Chunk overlap | top_k |
|---|---|---|---|---|
| Small chunk embedding | ANN | 256 | 16 | 3 |
| Metadata embedding | ANN | 800 | 64 | 5 |
| Self-query | ANN + MetaDataFilter | 512 | 64 | 7 |

Each of small chunk embedding and metadata embedding may be indexing technology for generating and utilizing a different vector storage by splitting and indexing the data 330 of the user 310 into chunks with a different size.

For example, for the small chunk embedding, the retrieval-augmented generation system 300 may generate a first vector storage by splitting and embedding the data 330 based on a chunk unit with a first chunk size. A small chunk embedding retriever may retrieve data associated with the query of the user 310 from the first vector storage. The small chunk embedding may mechanically split the data 330 into chunks with the first chunk size, but may also split a chunk based on a proposition unit using a large language model (LLM) depending on (or based on) example embodiments.

For the metadata embedding, the retrieval-augmented generation system 300 may extract content (or primarily extract content) that requires inference from the data 330 through the LLM and store the same as metadata and then, may generate a second vector storage by embedding information that includes original text and the metadata. A second chunk size for the metadata embedding may be preset to have a larger value (or a relatively larger value) than the first chunk size for the small chunk embedding. A metadata embedding retriever may retrieve data associated with the query of the user 310 from the second vector storage. For example, the retrieval-augmented generation system 300 may extract metadata, such as "2023 Sep. 18 AAA meeting," from the original text such as "2023 Sep. 15 (Fri)/Hong Gil-dong/has AAA meeting on the next Monday." Then, the retrieval-augmented generation system 300 may extract an embedding that includes the original text "2023 Sep. 15 (Fri)/Hong Gil-dong/has AAA meeting on the next Monday" and the metadata "2023 Sep. 18 AAA meeting" and may store the embedding in the second vector storage. The metadata like this date may increase search accuracy when the metadata embedding retriever conducts a predetermined search later. Also, the extracted metadata may improve the performance of a reply generation model by adding a prompt for a later response generation.

As the name suggests, a self-query retriever may be a retriever having the capability of asking itself. If a natural language query is given, the self-query retriever may generate a structured query using an LLM chain that constitutes the query and then may apply the structured query to the basic vector storage 340. Through this, the self-query retriever may use an input query to compare semantic similarity with content of a stored document and may extract a filter from a user query on metadata of the stored document and may execute the corresponding filter. For example, if a natural language query, such as "tell me about schedule of last week," the self-query retriever may generate and utilize a metadata filter as a structured query such as "2023 Dec. 12<=date<=2023 Dec. 18."

Additionally or alternatively, in the example of Table 1, "top_k" may represent the number of search results to be retrieved for each retriever. To optimize the performance of a corresponding retriever, the number of search results to be retrieved from each constructed retriever (e.g., "top_k") may need to be appropriately determined. An appropriate value of "top_k" may be different for each domain and each piece of data even for the same retriever.

To this end, a value of "top_k" may be tuned through qualitative assessment and/or quantitative assessment. For example, to use the qualitative assessment, a value of "top_k" may be tuned through performance assessment for each retriever over a set of questions (e.g., date, person, information, etc.) of a specific category. In some example embodiments, to use the quantitative assessment, a value of "top_k" may be tuned through performance assessment for each retriever using a well-known solution (e.g., RAG Assessment (Ragas)) to assess LLM generation text for providing insight into a RAG pipeline.

Additionally or alternatively, the maximum number of chunks retrievable for each retriever may be "top_k", but the number of search results retrieved for each retriever depending on (or based on) a query may be changed to "top_k" or less. For example, when it is assumed that the self-query retriever generates and utilizes a filter related to "date," the number of search results for a user query that does not include date information may be 0. Additionally or alternatively, although each retriever extracts up to "top_k" search results, search results with low correlation to the query may be excluded through postprocessing as follows.

Similarity-based: Among "top_k" search results, search results of which similarity to the query is less than or equal to a preset threshold may be excluded.

LLM-based: Similarity-based search results may be biased with respect to a specific keyword, so search results different from an actual query in context may be extracted. To compensate for this, whether there is a relationship between the query and search results (each of "top_k" search results) may be verified by calling an LLM and search results determined to be irrelevant may be excluded.

Recency-based: Each retriever may extract "top_k" or more search results and may use k data that includes the most recent data among the extracted search results as search results.

This retrieval-augmented generation system 300 may perform the role of an assistant that supports decision of the user 310 based on experience or knowledge of the user 310 and analyzed personality of the user 310, using the data 330 of the user 310. Additionally or alternatively, the retrieval-augmented generation system 300 may also perform the role of an assistant that analyzes information and patterns of the user 310 and recommends customized schedule or information (e.g., preferred shopping list).

Additionally or alternatively, the retrieval-augmented generation system 300 may also perform the function according to the query in addition to providing a response to the query of the user 310. For example, the retrieval-augmented generation system 300 may be linked to a specific function, tool, and the like. A case in which the retrieval-augmented generation system 300 is linked with a specific collaboration tool (e.g., Slack) may be considered. It is assumed that the user 310 enters the query "send summary of May schedule to Slack" or "send next week's schedule in Markdown format to Slack team_xxx channel."

Rather than simply generating the response to the query and providing the response to the user 310, the retrieval-augmented generation system 300 may summarize "May schedule" retrieved based on the indexed data 330 and transmit the same to an account of the user 310 in the linked collaboration tool, or may convert "Next week's schedule" retrieved based on the indexed data 330 to the Markdown format and transmit the same to "team_xxx channel" in the linked collaboration tool. In some example embodiments, when the retrieval-augmented generation system 300 is linked to a calendar tool, the retrieval-augmented generation system 300 may register a schedule retrieved based on the data 330 in response to the query of the user 310, to a calendar of the user 310.

Figure 4:
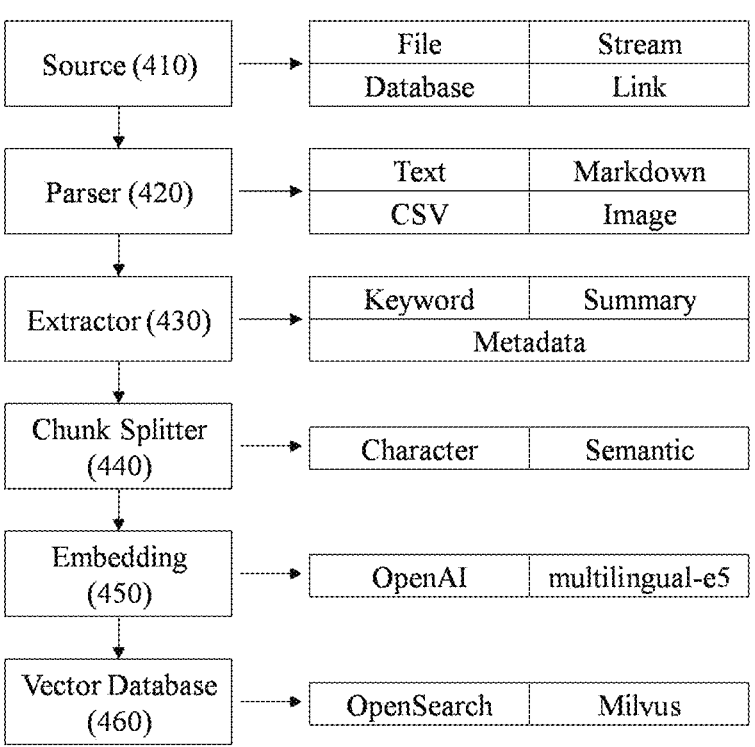
FIG. 4 illustrates an example of a process of indexing data according to at least one example embodiment.

FIG. 4 illustrates an example of a process of indexing data according to at least one example embodiment.

A source 410 may represent a source to the data 330 of the user 310. The data 330 may be present in various forms, such as a file, a stream, a database, and a link, and the retrieval-augmented generation system 300 may acquire the data 330 of the user 310 from the source 410 present in various forms. As described above, the data 330 may be data generated and provided by the user 310, data collected on a service for the user 310 while the user 310 uses a specific service, data generated and provided by an administrator of the service in relation to a service used by the user 310, or data generated and provided in relation to a service operated by the user 310.

A parser 420 may be a tool for analyzing the syntax of the data 330 of the user 310. The data 330 may include data in the form of text, Markdown, CSV, and/or image, and the retrieval-augmented generation system 300 may parse the data 330 in various forms using the parser 420.

An extractor 430 may be a tool that extracts a keyword, a summary, and metadata from the parsed data 330 of the user 310. The retrieval-augmented generation system 300 may extract various information from the data 330 using the extractor 430.

A chunk splitter 440 may be a tool that splits the data 330 into a plurality of chunks. The retrieval-augmented generation system 300 may mechanically or semantically split the data 330 into the plurality of chunks using the chunk splitter 440.

An embedding 450 may be a process of generating a vector by embedding the data 330 in chunk unit. As described above, the embedding 450 may be performed using at least one of already known solutions, such as OpenAI and multilingual-e5, but example embodiments are not limited thereto.

A vector database 460 may store a vector generated through the embedding 450, and may correspond to the aforementioned vector storage 340. As described above, at least one of already known solutions, such as OpenSearch and Milvus, may be utilized as the vector storage 340, but example embodiments are not limited thereto.

FIG. 5 is a flowchart illustrating an example of a retrieval-augmented generation method according to at least one example embodiment. The retrieval-augmented generation method according to some example embodiment may be performed by at least one computer device 200. The processor 220 of the computer device 200 may be implemented to execute a control instruction according to a code of at least one computer program or a code of an operating system included in the memory 210. The processor 220 may control the computer device 200 to perform operations 510 to 560 included in the method of FIG. 5 in response to a control instruction provided from a code stored in the computer device 200.

In operation 510, the computer device 200 may acquire data of a user. For example, the data of the user may include at least one of data generated and provided by the user, data collected on a first service for the user while the user uses the first service, data generated and provided by an administrator of a second service in relation to the second service used by the user, and data generated and provided in relation to a third service operated by the user. For example, the data of the user may include information on instant messages transmitted and received in association with an account of the user on an instant messaging service used by the user. In some example embodiments, the data of the user may include customer consultation related information collected in relation to a customer service (CS) of the service used by the user. Additionally or alternatively, as an example of the data of the user, an example embodiment of using schedule data, a contact list, and/or shopping information of the user or using information on a product being sold on a service operated by the user may be described.

In operation 520, the computer device 200 may construct a vector database by embedding the data of the user. For example, the computer device 200 may analyze the data of the user and may extract at least one piece of information among a keyword, a summary, and metadata. Then, the computer device 200 may split the data of the user and the extracted information based on a chunk unit. Additionally or alternatively, the computer device 200 may generate a vector by embedding the data in chunk unit and may store the generated vector in the vector database.

In some example embodiments, the computer device 200 may construct a first vector database by splitting and embedding the data of the user based on a first chunk unit with a preset first chunk size. Additionally or alternatively, the computer device 200 may construct a second vector database by splitting the data of the user based on a second chunk unit with a second chunk size having a larger value (or a relatively larger value) than the first chunk size, by extracting metadata required for inference from the data split based on the second chunk unit using an artificial intelligence model, and by embedding the data split based on the second chunk unit and the extracted metadata. The first vector database may be used for the aforementioned small chunk embedding retriever, and the second vector database may be used for the metadata embedding retriever.

In operation 530, the computer device 200 may receive and embed a query of the user. For example, each retriever may generate a corresponding vector by embedding the query of the user. The generated vector may be used to retrieve data corresponding to the query of the user from the vector database.

In operation 540, the computer device 200 may retrieve data corresponding to the embedded query of the user from the vector database using each retriever of a plurality of retrievers that differ from each other. For example, the plurality of retrievers may include at least two of a first retriever that retrieves the data corresponding to the embedded query of the user from the first vector database constructed by splitting and embedding the data of the user based on the first chunk unit with the preset first chunk size, a second retriever that retrieves the data corresponding to the embedded query of the user from the second vector database constructed by splitting and embedding the data of the user based on the second chunk unit with the second chunk size having a larger value (or a relatively larger value) than the first chunk size, and a third retriever that searches the vector database by generating a structured query using the artificial intelligence model for the query. The second vector database may be constructed by embedding the metadata extracted using the artificial intelligence model from data split based on the second chunk unit and the data split based on the second chunk unit. Meanwhile, the first retriever may correspond to the aforementioned small chunk embedding retriever, the second retriever may correspond to the metadata embedding retriever, and the third retriever may correspond to the self-query retriever.

The computer device 200 may retrieve search results within the maximum number of searches individually set for each of the plurality of retrievers. The maximum number of searches may correspond to "top_k" described above.

Additionally or alternatively, in some example embodiments, the computer device 200 may change the number of search results retrieved by each of the plurality of retrievers according to the query of the user.

Additionally or alternatively, in some example embodiments, in operation 540, the computer device 200 may calculate a similarity between the query of the user and search results retrieved by each of the plurality of retrievers, and may remove search results of which the similarity is less than or equal to a threshold.

Additionally or alternatively, in some example embodiments, in operation 540, the computer device 200 may determine relevance between the query of the user and search results retrieved by each of the plurality of retrievers, and may remove search results determined to be irrelevant. The artificial intelligence model may include an LLM. It may be a model different from an artificial intelligence model for generating a response to the query of the user in operation 550.

Additionally or alternatively, in some example embodiments, in operation 540, the computer device 200 may verify the most recent n search results among search results retrieved by each of the plurality of retrievers. In some example embodiments, n denotes a natural number less than or equal to the maximum number of searches differently determined for each of the plurality of retrievers, and a value of n may be differently determined for each of the plurality of retrievers.

In operation 550, the computer device 200 may generate a response to the query of the user by inputting a prompt that includes the query and the data retrieved using each of the plurality of retrievers, into an artificial intelligence model.

In operation 560, the computer device 200 may perform the function according to the query of the user using a tool linked to the computer device 200. The function according to the query of the user may include at least one of a first function of transmitting data corresponding to the query of the user to an account of the user in a preset collaboration tool or a specific channel of the collaboration tool and a second function of registering the data according to the query of the user to the service used by the user.

As described above, according to some example embodiments, it is possible to provide a method and system for advanced retrieval-augmented generation through metadata extraction and search engine mixing. The method and system for advanced retrieval-augmented generation disclosed herein may be a cost-effective approach that improves an output (e.g., information, results, answers, etc.) provided by a large language model (LLM) by reducing or preventing (or supplementing) a hallucination phenomenon and/or untrained knowledge of the LLM. The method and system for advanced retrieval-augmented generation disclosed herein may improve the technology filed of LLM by optimizing an output of an LLM to refer to a trusted knowledge base outside a learning data source of the LLM before generating an output (e.g., a response).

In some example embodiments, the method and system for advanced retrieval-augmented generation disclosed herein may provide an output to a user, and may transmit (or send, or upload) the output to a database, cloud storage, secure server, or the like, for the output to be saved in a non-transitory computer readable storage medium and/or any other non-transitory storage medium. In some example embodiments, the method and system for advanced retrieval-augmented generation disclosed herein may be configured to instruct an image forming device, such as a printer or other output device, to print a physical copy of the output. In some example embodiments, the method and system for advanced retrieval-augmented generation disclosed herein may be configured to compress, watermark, or encrypt the output to ensure it meets specific security standards before uploading it to an online system, such as a database, cloud storage, secure server, or the like.

One or more functional blocks and/or elements shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems or the apparatuses described above may be implemented using hardware components, software components, and/or combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For simplicity, the description of the processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, or in a propagated signal wave capable of providing instructions or data to or being interpreted by the processing device. The software also may be distributed over network coupled computer devices so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may include, alone or in combination with program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media may include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software. Examples of the program instructions include an advanced language code that may be executed by a computer using an interpreter as well as a machine language code as produced by a compiler.

While this disclosure includes some example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A retrieval-augmented generation method of a computer device comprising at least one processor, the method comprising:

acquiring, by the at least one processor, data of a user;

constructing, by the at least one processor, a vector database by embedding the data of the user into a first vector;

receiving, by the at least one processor, and embedding a query of the user into a second vector;

retrieving, by the at least one processor, data from the second vector corresponding to the embedded query of the user from the vector database using a plurality of retrievers, each retriever of the plurality of retrievers differing from each other; and generating, by the at least one processor, a response to the query of the user by inputting a prompt to an artificial intelligence model, the prompt including the query and the data retrieved using the plurality of retrievers, wherein the plurality of retrievers include at least two of:

a first retriever configured to retrieve the data corresponding to the embedded query of the user from a first vector database constructed by splitting and embedding the data of the user based on a first chunk unit with a first chunk size, a second retriever configured to retrieve the data corresponding to the embedded query of the user from a second vector database constructed by splitting and embedding the data of the user based on a second chunk unit with a second chunk size having a larger value than the first chunk size, and a third retriever configured to search the vector database by generating a structured query using the artificial intelligence model for the query, and wherein the second vector database is constructed by embedding data split based on the second chunk unit and metadata extracted using the artificial intelligence model from the data split based on the second chunk unit.

2. The method of claim 1, wherein the retrieving comprises retrieving search results within a maximum number of searches individually set for each retriever of the plurality of retrievers.

3. The method of claim 1, wherein the retrieving comprises changing a number of search results retrieved by each retriever of the plurality of retrievers based on the query of the user.

4. The method of claim 1, wherein the retrieving comprises:

calculating a similarity between the query of the user and search results retrieved by each retriever of the plurality of retrievers, and removing search results with the similarity being less than or equal to a threshold.

5. The method of claim 1, wherein the retrieving comprises:

determining relevance between the query of the user and search results retrieved by each retriever of the plurality of retrievers, and removing search results determined to be irrelevant.

6. The method of claim 1, wherein the retrieving comprises verifying a recent k search results among search results retrieved by each retriever of the plurality of retrievers, and the k denotes a natural number less than or equal to a maximum number of searches differently determined for each retriever of the plurality of retrievers.

7. The method of claim 1, wherein the constructing of the vector database comprises:

analyzing the data of the user and extracting at least one piece of information among a keyword, a summary, and metadata;

splitting the data of the user and the extracted at least one piece of information based on a chunk unit;

generating the first vector by embedding the data in the chunk unit; and storing the first vector in the vector database.

8. The method of claim 1, wherein the constructing of the vector database comprises:

constructing the first vector database by splitting and embedding the data of the user based on a first chunk unit with a first chunk size; and constructing the second vector database by splitting the data of the user based on a second chunk unit with a second chunk size having a larger value than the first chunk size, by extracting metadata required for inference from the data split based on the second chunk unit using the artificial intelligence model, and by embedding the data split based on the second chunk unit and the extracted metadata.

9. The method of claim 1, wherein the data of the user includes at least one of:

data generated and provided by the user, data collected on a first service for the user while the user uses the first service, data generated and provided by an administrator of a second service in relation to the second service used by the user, and data generated and provided in relation to a third service operated by the user.

10. The method of claim 1, wherein the data of the user includes information on instant messages transmitted and received in association with an account of the user on an instant messaging service used by the user.

11. The method of claim 1, wherein the data of the user includes customer consultation related information collected in relation to a customer service (CS) of a service used by the user.

12. The method of claim 1, further comprising:

performing, by the at least one processor, a function based on the query of the user using a tool linked to the computer device.

13. The method of claim 12, wherein the function based on the query of the user includes at least one of:

a first function of transmitting data corresponding to the query of the user to an account of the user in a collaboration tool or a specific channel of the collaboration tool, and a second function of registering the data based on the query of the user to a service used by the user.

14. A non-transitory computer-readable recording medium storing instructions that, when executed by a processor, cause the processor to perform the method of claim 1.

15. A computer device comprising:

at least one processor configured to execute computer-readable instructions, wherein the at least one processor is configured to, acquire data of a user, construct a vector database by embedding the data of the user into a first vector, receive and embed a query of the user into a second vector, retrieve data corresponding to the embedded query of the user from the vector database using a plurality of retrievers, each retriever from the plurality of retrievers differing from each other, and generate a response to the query of the user by inputting a prompt to an artificial intelligence model, the prompt including the query and the data retrieved using each retriever of the plurality of retrievers, wherein the plurality of retrievers include at least two of:

a first retriever configured to retrieve the data corresponding to the embedded query of the user from a first vector database constructed by splitting and embedding the data of the user based on a first chunk unit with a first chunk size, a second retriever configured to retrieve the data corresponding to the embedded query of the user from a second vector database constructed by splitting and embedding the data of the user based on a second chunk unit with a second chunk having a larger value than the first chunk size, and a third retriever configured to search the vector database by generating a structured query using the artificial intelligence model for the query, and wherein the second vector database is constructed by embedding data split based on the second chunk unit and metadata extracted using the artificial intelligence model from the data split based on the second chunk unit.

16. The computer device of claim 15, wherein the data of the user includes at least one of:

data generated and provided by the user, data collected on a first service for the user while the user uses the first service, data generated and provided by an administrator of a second service in relation to the second service used by the user, and data generated and provided in relation to a third service operated by the user.

* * * * *